United States Patent
Schreck et al.

(10) Patent No.: US 8,238,202 B2
(45) Date of Patent: Aug. 7, 2012

(54) DIRECTIONAL WAVEGUIDE COUPLER FOR ABS REFLECTED LIGHT

(75) Inventors: Erhard Schreck, San Jose, CA (US); Tobias Maletzky, Milpitas, CA (US); Xuhui Jin, San Jose, CA (US); Yuchen Zhou, San Jose, CA (US); Kenichi Takano, Santa Clara, CA (US); Joe Smyth, Aptos, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 12/928,678

(22) Filed: Dec. 16, 2010

(65) Prior Publication Data
US 2012/0155232 A1 Jun. 21, 2012

(51) Int. Cl.
*G11B 11/00* (2006.01)
(52) U.S. Cl. .................. 369/13.33; 369/13.13
(58) Field of Classification Search ............... 369/13.33, 369/13.13, 13.32, 13.02, 112.09, 112.14, 369/112.21, 112.27; 360/59; 385/129, 31, 385/88–94; 250/201.3, 201.5
See application file for complete search history.

(56) References Cited

U.S. PATENT DOCUMENTS

| | | | |
|---|---|---|---|
| 6,091,485 A | 7/2000 | Li et al. | |
| 7,359,599 B2 | 4/2008 | Matsumoto | |
| 2008/0192376 A1 | 8/2008 | Tanaka et al. | |
| 2008/0198496 A1 | 8/2008 | Shimazawa et al. | |
| 2008/0204916 A1* | 8/2008 | Matsumoto et al. | 369/13.33 |
| 2009/0165285 A1 | 7/2009 | Takayama et al. | |
| 2009/0185459 A1* | 7/2009 | Matsumoto | 369/13.33 |
| 2010/0214685 A1* | 8/2010 | Seigler et al. | 369/13.33 |
| 2010/0315735 A1* | 12/2010 | Zhou et al. | 369/13.33 |
| 2011/0026377 A1* | 2/2011 | Shimazawa et al. | 369/13.33 |
| 2011/0090587 A1* | 4/2011 | Chou et al. | 369/13.33 |
| 2011/0205660 A1* | 8/2011 | Komura et al. | 369/13.33 |
| 2011/0216635 A1* | 9/2011 | Matsumoto | 369/13.33 |

OTHER PUBLICATIONS

Co-pending US Patent HT09-003, U.S. Appl. No. 12/456,290, filed Jun. 15, 2009, "Plasmon Antenna With Magnetic Core for Thermally Assisted Magnetic Recording," assigned to the same assignee as the present invention.

* cited by examiner

*Primary Examiner* — Tan X Dinh
(74) *Attorney, Agent, or Firm* — Saile Ackerman LLC; Stephen B. Ackerman (57) ABSTRACT

A waveguide structure for a TAMR head is disclosed wherein at least one detection waveguide is formed parallel to a main waveguide and located a gap distance therefrom. A light source transmits light into the main waveguide and towards an ABS/medium interface. A plasmon generator converts light from the waveguide into plasmon waves that are directed onto a magnetic medium. Back reflected light is captured by the main waveguide, partially diverted into a detection waveguide, and transmitted to a photo detector that measures light intensity ($I_B$) which correlates closely to the plasmon wave intensity at the ABS/medium interface. A controller linked to the photo detector is employed to calculate $I_B$ as a function of ABS/medium spacing in a non-write condition and this relationship can be used to control and maintain a constant plasmon wave intensity at the ABS during a series of TAMR write processes with a plurality of media.

21 Claims, 6 Drawing Sheets

DIRECTIONAL WAVEGUIDE COUPLER FOR ABS REFLECTED LIGHT

RELATED PATENT APPLICATION

This application is related to the following: Ser. No. 12/456,290, filing date Jun. 15, 2009; assigned to a common assignee and herein incorporated by reference in its entirety.

FIELD OF THE INVENTION

The invention relates to magnetic read/write heads based on thermally assisted magnetic recording (TAMR) and in particular to a TAMR head in which a coupling waveguide is provided on at least one side of a main waveguide to enable an improved measurement of light energy at the media interface with the air bearing surface (ABS) which means a more controlled heating gradient at the media for higher recording density.

BACKGROUND OF THE INVENTION

TAMR is expected to be one of the future generation of magnetic recording technologies that will enable recording at ~1-10 Tb/in$^2$ data densities. TAMR involves raising the temperature of a small region of a magnetic medium to near its Curie temperature where both of its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, with a sharp temperature gradient of TAMR acting alone or in combination with a high magnetic field gradient, data storage density can be further improved with respect to current state of the art recording technology.

In addition to the components of conventional write heads, a TAMR head also typically includes an optical wave guide (WG) and a plasmon antenna or plasmon generator (PG). The waveguide may be directly attached to a laser diode (LD) light source, or in the case of a free space light beam, a lens is used to focus light onto a waveguide inlet. The waveguide serves as an intermediate path to guide light from the LD or free space light beam to the PA or PG where the light optical mode couples to the local plasmon mode of the PA or to the propagating plasmon mode of the PG. After the optical energy is transformed to plasmon energy, either with local plasmon excitation in the PA or with energy transmission along the PG, it is concentrated at the medium location where heating is desired. Preferably, the heating spot is aligned with the magnetic field from the write head to realize optimum TAMR performance.

Figure 1A:
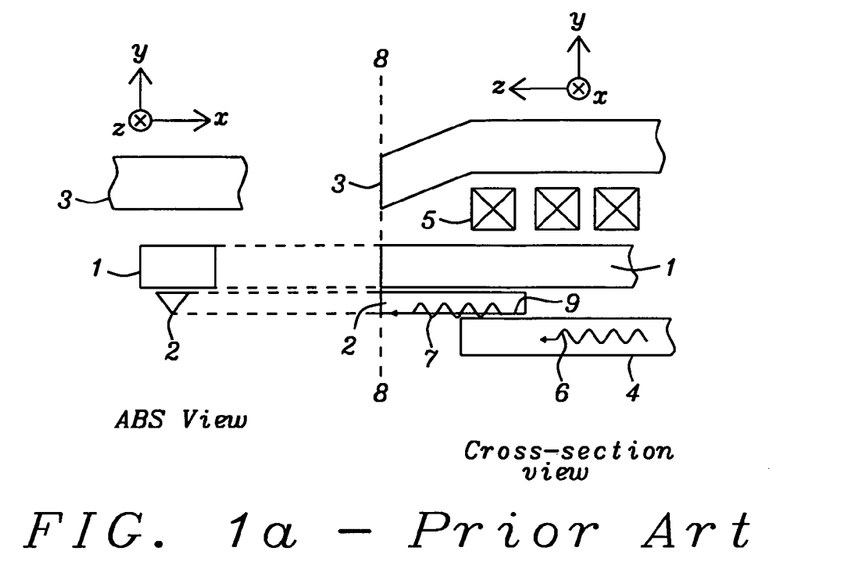
FIG. 1a shows a prior art TAMR structure with a plasmon generator having a triangular shape and operating in an edge plasmon mode.
Figure 1B:
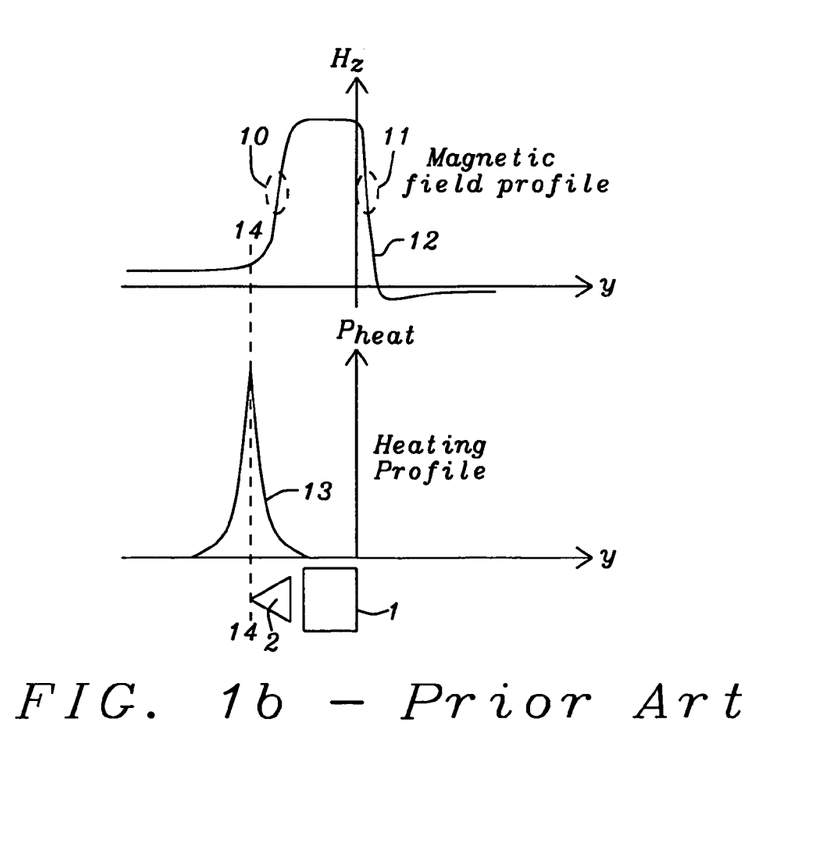
FIG. 1b shows the overlap of the heating profile with the magnetic field profile at the ABS/media interface.

A thermally assisted magnetic head structure disclosed in U.S. Patent Application Publications 2008/0192376 and 2008/0198496 employs an edge plasmon mode that is coupled to a waveguide as represented in FIG. 1a. Conventional components of a magnetic recording structure are shown as a main pole 1, return pole 3, and write coils 5 formed along an air bearing surface (ABS) 8-8. The wave guide 4 guides the input optical light wave 6 toward the ABS 8-8 in the center cross-sectional view. As shown in the prospective view, plasmon generator 2 has a triangular shape and may extend a certain distance from the ABS before meeting WG 4. Optical wave 6 couples to the edge plasmon (EP) mode 7 that is excited and propagates along the sharp edge 9 of plasmon generator 2 adjacent to the WG 4. Plasmon mode 7 further delivers the optical power toward the ABS and locally heats a medium (not shown) placed underneath the plasmon generator 2. A plasmon generator is typically made of noble metals such as Ag and Au that are known to be excellent generators of optically driven surface plasmon modes. The local confinement of the edge plasmon mode 7 is determined by the angle and radius of the triangle corner. In FIG. 1b, the magnetic field profile and heating profile are shown with slopes 10 and 13, respectively, that have a slight overlap along the dashed vertical line 14-14.

In TAMR recording, it is critical to know the actual light intensity available in the nearfield at the ABS and medium because this detail determines the quality of the data written into the media. Light intensity and therefore energy density in the media can vary as light source (LD) power, head media spacing, media velocity, and device performance change. In order to monitor these changing conditions, an integrated light intensity measurement device is needed. Intensity measurements should be very efficient in the use of light energy so that a higher power light source is not required. It is also desirable to be able to obtain light intensity measurements over existing data tracks in the absence of a magnetic field to determine if the slider is in a loaded or unloaded condition. One method that is currently used to determine the approximate intensity of a light reaching the ABS is to position a photo detector behind the light source and measure the light intensity propogated in a direction away from the ABS since this value is typically about 10% of the intensity directed towards the media. However, this is a relatively inaccurate measurement since the percentage of light propogated from the light source away from the ABS may vary over time. Furthermore, other factors influence the amount of light propogated through the waveguide toward the media such that the light intensity emanating from the light source near the back end of the waveguide does not necessarily correlate well to the light intensity proximate to the ABS. Therefore, a more accurate measurement technique is required for adequate light control in TAMR designs.

A routine search of the prior art resulted in the following references.

In U.S. Pat. No. 6,091,485, a detector is used to determine physical properties of a material by obtaining measurements of reflected light from a layer of the material.

U.S. Patent Application Publication 2008/0204916 discloses how light propagating through a main waveguide is partially diverted into a second waveguide before reaching the ABS, and the second waveguide directs the diverted light to a photo detector for a light intensity measurement.

U.S. Patent Application Publication 2009/0165285 describes how light intensity in the core of an optical waveguide is measured by providing a light shielding film with a pinhole formed opposite the light exit surface of the waveguide.

U.S. Patent Application Publication 2007/0242921 teaches how to prevent a decrease in near field intensity at the ABS by employing a light scatterer near the ABS to minimize the intensity of back reflected light.

SUMMARY OF THE INVENTION

One objective of the present invention is to provide an improved waveguide structure that enables back reflected light intensity from the ABS/medium interface to be measured for a more accurate reading of light intensity at the ABS and media in a TAMR scheme.

A second objective of the present invention is to provide a waveguide design that allows back reflected light intensity to be measured over data so that a head media spacing change may be detected at a fixed LD power in the absence of a magnetic field.

These objectives are achieved in the present invention wherein a TAMR write head comprises a main waveguide that receives light from a light source and then delivers a substantial portion of the input light energy to a near field device such as an edge plasmon generator (EPG). The EPG transforms light into plasmon waves and produces a near field at the ABS and recording media. At the transition from EPG to the air and media, impedance changes occur that result in partial reflection of the incoming propagating light. Reflected light travels back into an end of the main waveguide, is transmitted back towards the light source, and a small portion thereof is decoupled out into a single detection waveguide or into two adjacent detection waveguides symmetrically formed on either side of the main waveguide in a cross-track direction. Each detection waveguide has an end opposite the ABS that is in close proximity to a detector for measuring light intensity which is strongly correlated to light absorption at the ABS and media. In a closed loop scheme, the light intensity data from a photo detector is fed to a controller which then analyzes the data and sends a command to the light source to increase or decrease light output, if necessary, to maintain a stable light intensity at the ABS and media.

From a top-down view, the main waveguide extends from the ABS to the back end of the slider in a direction perpendicular to the plane of the media. Each detection waveguide is recessed from the ABS by a first distance and has at least two sections. A first section nearest the ABS is formed parallel to the main waveguide and has a lengthwise dimension in a direction perpendicular to the ABS called the coupling length which is about 2 to 10 microns. A second section has a first end attached to an end of the first section and flairs outward from the main waveguide. In one embodiment, a second end of the second section is connected to a third section which is aligned substantially parallel to the main waveguide. An end of the third section opposite the second section does not necessarily terminate at the end of the slider and may be connected to a photo detector or separated therefrom by a gap material such as an anti-reflective coating which has a refractive index (RI) between that of the waveguide and photo detector. In an alternative embodiment, the third section is omitted and the second end of the second section is attached to a photo detector or separated therefrom by a gap material.

The present invention is also an integrated light measurement device comprised of the aforementioned light source, waveguides, EPG, and photo detector. The incoming light path from the light source passes through the main waveguide and into the EPG where it is transformed into plasmon waves that produce a nearfield at the ABS and magnetic medium. Back reflected light due to impedance changes at the ABS/media interface is captured by the main waveguide and a portion thereof is diverted into at least one detection waveguide that directs the light into a photo detector. The photo detector makes a light intensity measurement and the data is sent to a controller which in turn is linked to the light source so that an adjustment in light intensity emitted by the light source may be made to maintain an essentially constant intensity of the nearfield at the medium. Back reflected light is strongly correlated to the ABS-media spacing which varies from one medium to the next, and a light intensity measurement during a non-write condition for each medium may be used to calculate the power needed at the light source to generate a constant light intensity at the ABS during subsequent TAMR write processes.

DETAILED DESCRIPTION OF THE INVENTION

The present invention is a waveguide structure for use with an edge plasmon generator (EPG) in a TAMR write head to enable a more accurate determination of the energy absorption at the ABS/media interface which provides a better means of monitoring and controlling the TAMR process. Edge plasmon generator and plasmon antenna may be used interchangeably with "near field device" in the embodiments described herein. Moreover, the write head may be part of a merged read/write head design. Although the exemplary embodiments depict an EPG having a triangular shape, the present invention also encompasses other shapes for plasmon antenna or plasmon generator structures wherein an edge plasmon mode is generated. The present invention is also a method for determining light intensity at the ABS in a TAMR scheme and includes an integrated light measurement device comprised of a photo detector, controller, light source and wave guides arranged in a closed loop configuration to enable real time adjustments of light source output.

Figure 2:
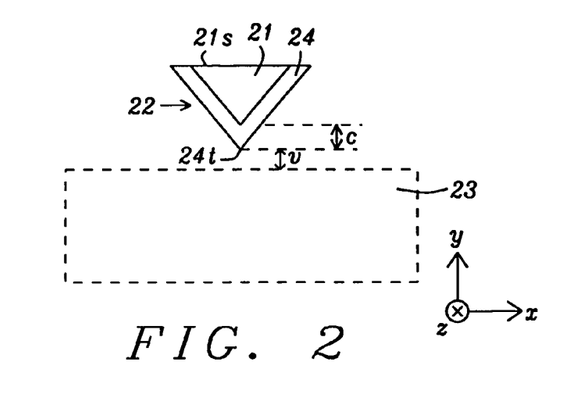
FIG. 2 is an ABS view showing an edge plasmon generator that is separated from a waveguide by a gap distance according to an embodiment of the present invention.

Referring to FIG. 2, an edge plasmon generator (EPG) design is shown that was previously disclosed by the inventors in related patent application Ser. No. 12/456,290 and has a triangle shape to couple the edge plasmon mode 27 to the input light 26 from the waveguide 23 that may be recessed from the ABS. Unlike the prior art, EPG 22 comprises a magnetic core 21 and a plasmon layer 24 having a thickness c on two sides which converge at tip 24t facing the waveguide 23. Magnetic core 21 and main pole layer (not shown) may be comprised of one or more of Co, Fe, Ni, and B, or alloys thereof. In one aspect, the main pole and magnetic core 21 may have the same composition. Plasmon layer 24 is preferably made of Au and/or Ag with a thickness c from about 10 to 100 nm and extends in a z-axis (lengthwise) direction perpendicular to the ABS. In one embodiment, plasmon layer 24 includes two sides which converge at a vertex or tip 24t to form a "V" shape and overlay on the magnetic core 21 that forms a third side of the EPG 22. Note that the third side 21s preferably adjoins main pole and may be considered part of the leading side of the main pole layer. It should be understood that the main pole (and TAMR head) move opposite to the y-direction or down-track direction during a write process. The x-axis represents the cross-track direction while the z-axis is towards the back end of the device. In an alternative embodiment as described in related patent application Ser. No. 12/456,290, there may be a separation layer between side 21s and the main pole.

The plasmon mode is produced by radiative coupling with optical frequency electromagnetic radiation generated by an optical laser or the like and is transmitted toward the ABS within the plasmon layer 24 while the magnetic core 21 concentrates magnetic flux close to the heating point of the EPG and enhances the magnetic field (not shown) at the magnetic medium heating location during writing. Thus, the EPG 22 effectively becomes an extension of the magnetic pole producing a magnetic field whose maximum gradient overlaps the magnetic medium region being heated by edge plasmons produced in the plasmon layer 24. The close overlap improves the effectiveness of a magnetic field from the write pole in changing local magnetization of the magnetic medium so that magnetic writing is greatly enhanced and can be confined to small surface areas. The gap distance v between tip 24t and waveguide 23 is from 20 to 50 nm and is preferably filled with silicon oxide, alumina, silicon oxynitride, or $MgF_2$ to optimize light transmission between the waveguide and EPG 22.

Figure 3:
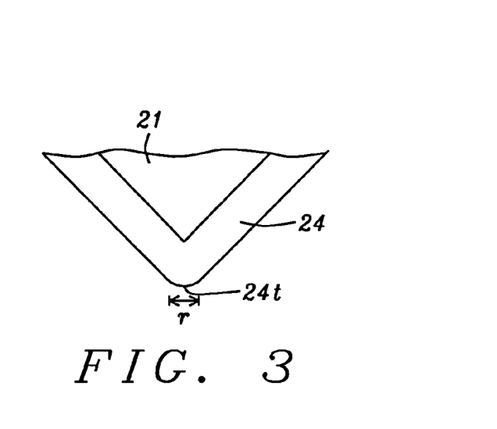
FIG. 3 is an enlarged view of the edge plasmon generator in FIG. 2 that indicates the tip generally has a curvature with a radius "r".

Referring to FIG. 3, the tip 24t of the EPG 22 usually has curvature due to the manufacturing process and typically has a radius r of around 20 nm. Smaller r values are difficult to produce with current manufacturing methods.

Herein we disclose additional improvements in our TAMR design that enable a more accurate determination of light intensity at the ABS and additional advantages which further improve the write performance of a TAMR head. In particular, various embodiments are described wherein at least one detection waveguide also referred to as a light decoupler is included with a lengthwise dimension formed parallel to a main waveguide. A detection waveguide enables a portion of back reflected light from the ABS and media that is captured by the main waveguide to be diverted for measurement purposes. In particular, an end of the detection waveguide facing away from the ABS is adjoined to a photo detector or separated therefrom by a gap material such as an anti-reflection coating (ARC) to facilitate light intensity measurements. The intensity of back reflected light coupled into the one or two detection waveguides is a small fraction of the light propagated toward the ABS in the main waveguide so as not to disturb the single mode in the main waveguide.

Figure 4A:
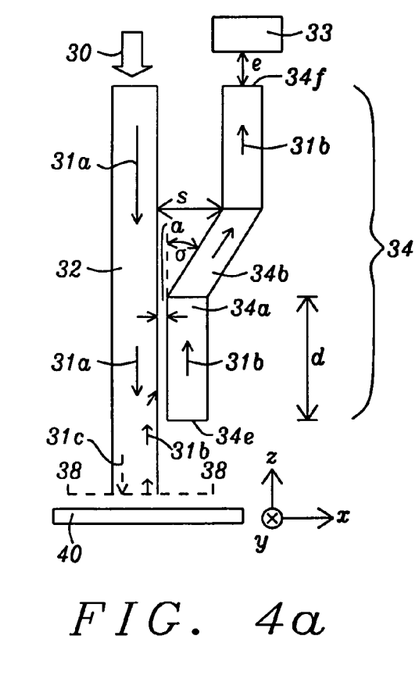
FIG. 4a is a top view of a waveguide structure including a main waveguide and a single detection waveguide that is recessed a certain distance from the ABS and positioned on one side of the main waveguide according to an embodiment of the present invention.
Figure 4B:
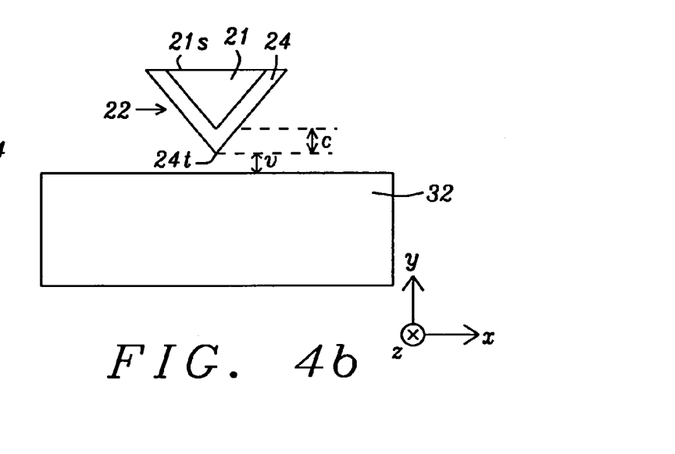
FIG. 4b is an ABS view of the main waveguide and EPG.

Referring to FIG. 4a, a first embodiment of the present invention is depicted from a top view. Dielectric layers, EPG, and main pole are not illustrated in order to point out the features of the waveguide structure. There is a main waveguide 32 having a lengthwise dimension in a z-axis direction that is perpendicular to the plane of the medium 40 and to the ABS 38-38. Waveguide 32 serves to direct light 31a from a light source 30 towards the ABS 38-38. A substantial portion of light 31a is coupled to a near field device (not shown) which converts light into plasmon waves 31c that are transmitted the final distance to the ABS and produce a near field at the ABS and medium 40. In a preferred embodiment, the present invention employs an EPG 22 (FIG. 4b) as the near field device with a plasmon layer as described previously with respect to FIG. 2. The EPG has one end at the ABS 38-38 and extends in a z-axis direction for a distance k of about 1 to 1.5 microns as seen from a top view in (FIG. 4e). In the exemplary embodiment, waveguide 32 terminates at the ABS. The transition from EPG to air and media produces several impedance changes that result in partial reflection of the incoming propagating light. The most significant impedance change will occur at the ABS/recording medium interface. A portion of the reflected light also referred to as back reflected light 31b is captured by the waveguide 32 at the ABS and travels back towards the light source 30.

A key feature of the present invention is the addition of at least one detection waveguide 34 also known as a light decoupler proximate to the waveguide 32 that diverts a small percentage (preferably less than 10%) of light 31b into the detection waveguide which then transmits the light to a photo detector 33 so that an intensity measurement can be taken. The percentage of light 31b diverted to detection waveguide 34 is kept to a minimum to avoid disrupting the single light transition mode in the main waveguide 32. The intensity of light 31b reaching the photo detector 30 correlates strongly with the absorption of light 31c at the medium 40 and ABS 38-38 unlike earlier techniques that rely on a photo detector mounted on the back side of a light source to give an intensity measurement. Detection waveguide 34 is separated by a gap distance a of about 100 to 400 nm from waveguide 32. According to one embodiment, detection waveguide 34 may be comprised of three sections 34a, 34b, 34c wherein a first substantially rectangular section 34a having a lengthwise direction in the z-axis direction is formed parallel to waveguide 32. Distance d in the z-axis direction is called the coupling length of section 34a which is about 2 to 10 microns and together with gap distance a determines the coupling efficiency or amount of back reflected light 31b captured by detection waveguide 34. A first end 34e of section 34a faces the ABS and is recessed therefrom by 3 to 10 microns to provide a separation of at least 1 micron between EPG 22 and detection waveguide 34 thereby preventing any interference with the single light mode delivered by main waveguide 32 to the EPG.

Figure 9:
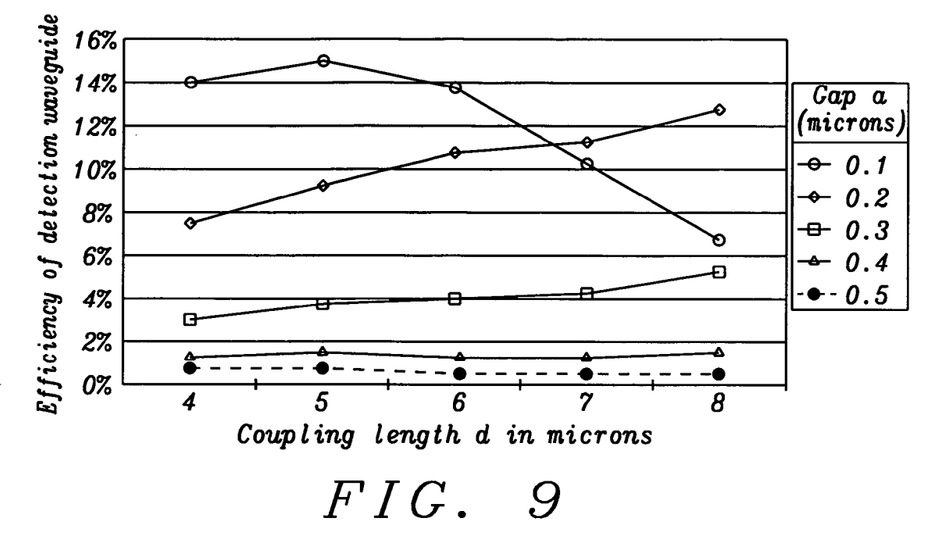
FIG. 9 is a plot that illustrates how coupling efficiency is related to the coupling length d of the detection waveguide of the present invention for different gap distances a between the main waveguide and the detection waveguides when diverting back reflected light from the former into the latter in the embodiment represented in FIG. 5.
Figure 10:
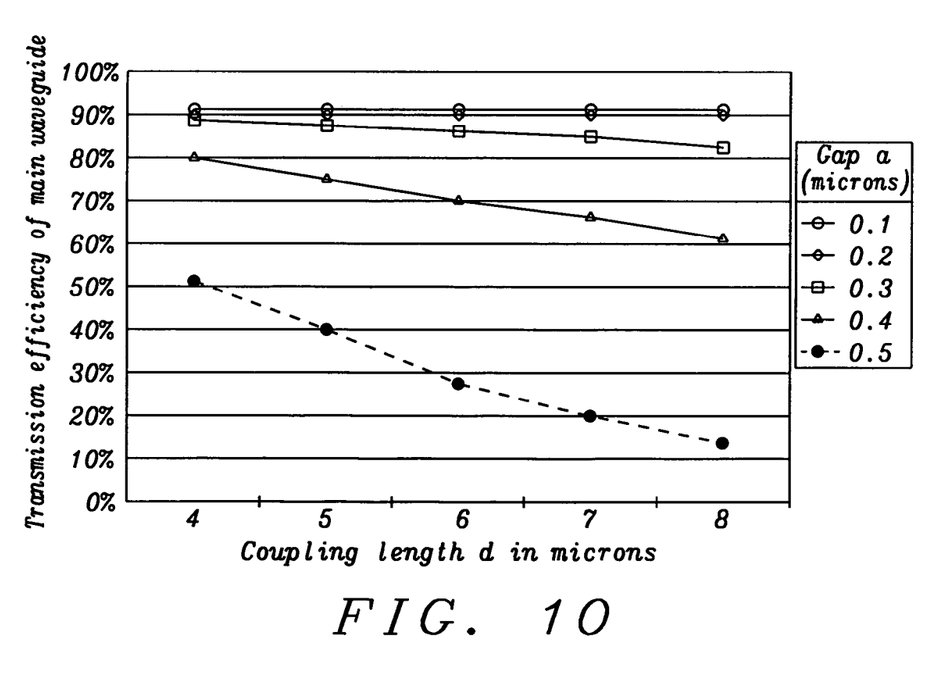
FIG. 10 is a plot that illustrates how transmitted light is affected by the coupling length d of the detection waveguide of the present invention for different gap distances a between the main waveguide and detection waveguide when no reflection occurs at the end of the main waveguide in the embodiment represented in FIG. 5.

Referring to FIG. 9, a plot of modeling data is included where the effect of coupling length d and gap distance a on coupling efficiency is illustrated. In FIG. 10, a similar plot is presented where the effect of coupling length d and gap distance a on transmission efficiency of the main waveguide is shown when no reflection occurs at the end of the main waveguide.

It is believed that about 90-95% of light 31a emitted by light source 30 and captured by waveguide 32 is coupled to EPG 22 and only about 5% may continue to ABS 38-38 through the main waveguide. There may also be a small fraction of light 31a diverted to detection waveguide 34 (section 34a) and an insignificant portion of this diverted light is likely to reach photo detector 33 at the opposite end of the detection waveguide. Even so, in order to minimize any incoming light 31a that may be coupled into detection waveguide and reflected back from end 34e to photo detector 33, the present invention anticipates alternative embodiments where end 34e is not parallel to ABS 38-38 but sloped at an angle such that any diverted light 31a is not reflected into section 34b.

Figure 4C:
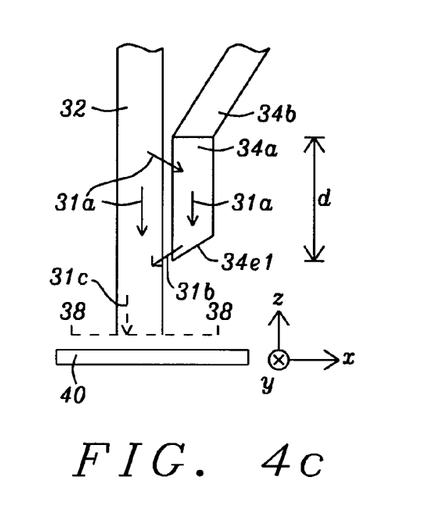
FIGS. 4c, 4d show alternative designs for the detection waveguide wherein an end facing the ABS is sloped in order to prevent input light from the light source from being reflected to the photo detector.

For example, in FIG. 4c an alternative embodiment is depicted that shows an end 34e1 where a side of section 34a adjacent to waveguide 32 has a longer length in the z-axis direction than the opposite side of section 34a which faces away from the main waveguide. As a result, a substantial portion of light 31a diverted into section 34a may be reflected back into waveguide 32 and away from section 34b. Note that back reflected light 31b is not shown in this drawing in order to clearly show the propagation of light 31a towards the ABS in waveguide 32 and in detection waveguide 34.

Figure 4D:
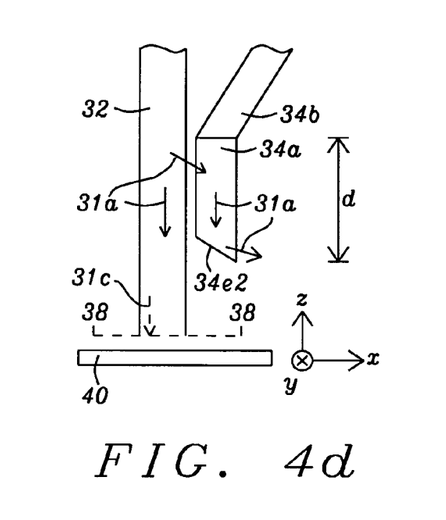
Figure 4E:
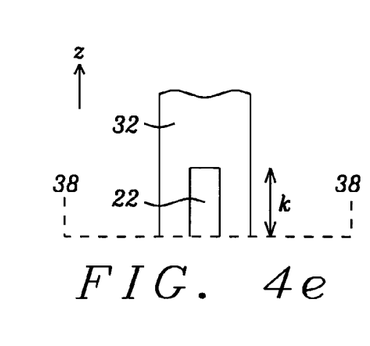
FIG. 4e is a top-down view of an edge plasmon generator (EPG) near field device that extends from the ABS and in a direction perpendicular to the ABS for a distance "k".

Referring to FIG. 4d, a second alternative embodiment is illustrated and shows an end 34e2 where a side of section 34a adjacent to waveguide 32 has a shorter length in the z-axis direction than the opposite side of section 34a. As a result, a substantial portion of light 31a diverted into section 34a may be reflected away from waveguide 32 and away from section 34b. Again, the back reflected light 31b is not depicted in the drawing in order to clearly show the propagation of light 31a towards the ABS.

Returning to FIG. 4a, section 34a has a second end that is opposite to end 34e and adjoins a first end of section 34b in detection waveguide 34. Preferably, section 34b is aligned at an angle σ between 0 and 90 degrees with respect to the z-axis direction and has essentially the same width as section 34a in the x-axis direction. Furthermore, the corners formed at the two sides of the section 34a/34b interface are not necessarily sharp as indicated in the drawing, but may have a certain amount of curvature similar to the rounded tip 24t previously described in EPG 22. In the exemplary embodiment, section 34b has a second end that is opposite the first end and adjoins a first end of a third section 34c. The interface of sections 34b, 34c is a separation distance s from waveguide 32 where s>a. Third section 34c is aligned substantially parallel to the lengthwise direction of waveguide 32 and has a second end 34f that faces away from the ABS.

In one aspect, end 34f adjoins photo detector 33 and the gap distance e=0. Alternatively, end 34f may be separated from photo detector 33 by a distance e of up to 3 microns and the gap 39 may be comprised of a resin with a refractive index of about 1.5, or air with a refractive index (RI)=1. Furthermore in the embodiment where gap 39 is comprised of air, there may be an anti-reflective coating (not shown) formed in the gap on end 34f with an appropriate thickness to maximize the transmission of back reflected light 31b through the gap, and with a RI between that of air (or resin) and the detection waveguide core 34 to ensure the difference in RI during light transmission from the detection 34 to the photo detector does not involve a large jump from approximately 2 (RI for a TaO waveguide=2.1-2.2, for example) to 1.

In an alternative embodiment, the RI change would progress from around 2 for detection waveguide 34 to a RI in the range of 1-1.5 for the anti-reflection coating (ARC) which is not shown, and then to a RI=1 for air to minimize the transmission losses due to reflection at the interface between the end 34f of detection waveguide and gap 39.

In yet another embodiment (not shown), the third section 34c may be omitted and a photo detector 33 is aligned with the second end of section 34b. The photo detector may adjoin the second end of section 34b at a separation distance s from the waveguide 32. Alternatively, the second end of the second section is separated from the photo detector 33 by a gap comprised of air or an ARC.

Figure 5:
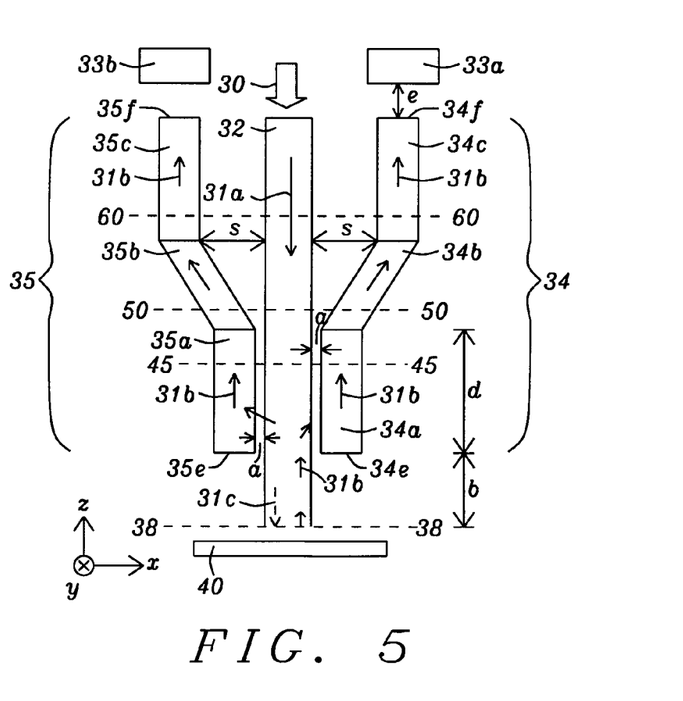
FIG. 5 is a top view of another embodiment of the present invention wherein a waveguide structure in a TAMR head includes two detection waveguides that are recessed a certain distance from the ABS and symmetrically aligned on either side of a main waveguide.

Referring to FIG. 5, a second embodiment of a TAMR waveguide structure is shown that comprises detection waveguides 34, 35 positioned on either side of the main waveguide 32 in a symmetrical configuration. The features of detection waveguide 34 are retained from the previous embodiment with the exception that the photo detector at the end 34f is designated as photo detector 33a. One concern with a single detection waveguide design as described in the previous embodiment is a slight distortion of the core (main) waveguide mode symmetry. However, symmetry may be maintained by adding a second detection waveguide on the opposite side of the main waveguide. In the exemplary embodiment, the detection waveguides 34, 35 terminate at essentially the same distance from the ABS as the main waveguide 32. Furthermore, the second detection waveguide 35 comprises three sections 35a, 35b, and 35c that are symmetrically positioned on the opposite side of waveguide 32 with regard to sections 34a, 34b, 34c, respectively. Preferably, the first (coupling) section 35a of waveguide 35 has essentially the same coupling length d and width dimension as that of the first section 34a of waveguide 34 in order to optimize the main waveguide mode symmetry as appreciated by those skilled in the art. Therefore, first section 35a has an end 35e facing the ABS 38-38 and is recessed the same distance b from the ABS as end 34e. A second end of the first section 35a interfaces with a first end of second section 35b and the second section forms an angle σ between 0 and 90 degrees with the z-axis direction. A second end of second section 35b adjoins a first end of third section 35c and is formed a separation distance s from waveguide 32 where s>a. Section 35c is aligned substantially parallel with the z-axis and terminates at an end 35f. End 35f faces away from the ABS and directs back reflected light into a photo detector 33b that either adjoins end 35f or is separated therefrom by a gap distance e that may be filled with one or more of air, an ARC, or a dielectric material.

It should be understood that one of the photo detectors 33a or 33b may be a dummy detector since the light intensity in either detection waveguide 34 or 35 is sufficient to provide the necessary measurement of back reflected light from the ABS/media interface. The gap distance a between the main waveguide 32 and the detection waveguides 34, 35 may be increased or the coupling length d may be decreased to lower the amount of back reflected light 31b that is diverted from the main waveguide. On the other hand, gap distance a may be decreased and/or coupling length d may be increased to increase the intensity of back reflected light 31b captured by detection waveguides 34, 35. Preferably, less than 10% of back reflected light 31*b* is diverted into detection waveguides 34, 35 so as not to disturb the single light transmission mode in the main waveguide 32. As explained in the previous embodiment, light 31*a* is generated by a light source 30 such as a laser diode (LD) and transmitted toward the ABS. A large majority of light 31*a* is converted to plasmon waves 31*c* along the EPG (not shown) which then produce a nearfield at the ABS 38-38 and recording medium 40. A key feature is that the intensity of back reflected light 31*b* measured by a photo detector 33*a* or 33*b* strongly correlates to the light intensity 31*c* at the ABS and media.

In an alternative embodiment, the detection waveguides may terminate along the plane 60-60 since it is not necessary to extend the two detection waveguides the same distance from the ABS as the main waveguide 32. In this case, the distance e between the ends of waveguides 34, 35 and photo detectors 33*a*, 33*b*, respectively would be maintained and the length of waveguide 32 along the z-axis remains unchanged.

According to another embodiment of the present invention, third sections 34*c*, 35*c* may be omitted entirely and the detection waveguides may terminate along a plane 50-50 that intercepts second sections 34*b*, 35*b*. As a result, photo detector 33*a* is configured at a distance e from the second end of section 34*b* and photo detector 33*b* is placed at a distance e from the second end of section 35*b* where e=0 for direct attachment, or e>0 when one or more of an air space, ARC, or dielectric material is formed between the detection waveguides 34, 35 and the nearest photo detector.

Figure 6:
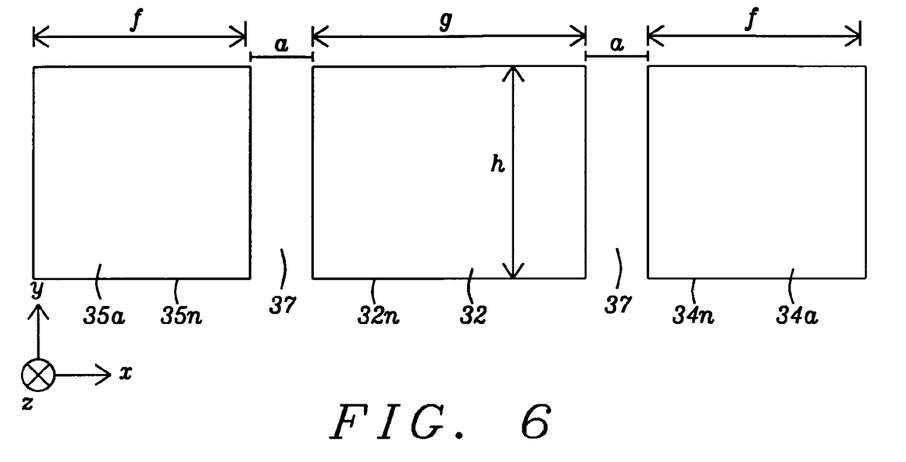
FIG. 6 is a cross-sectional view along plane 50-50 in FIG. 5 that depicts the configuration of the main waveguide and two side waveguides according to an embodiment of the present invention.

Referring to FIG. 6, a cross-sectional view of the waveguide configuration is depicted from a plane 45-45 (FIG. 5). In one aspect, the main waveguide 32 and detection waveguides 34, 35 have a width in the cross-track (x-axis) direction of from 400 nm to 800 nm and a thickness h in the down-track (y-axis) direction between 300 and 600 nm. Although the main waveguide is shown as having a width g greater than the width f of the detection waveguides, the present invention also anticipates that f≧g in alternative embodiments. Gap distance a is from 100 to 400 nm and is preferably filled with a low RI layer 37 such as alumina, silicon oxide, silicon oxynitride, or $MgF_2$. Preferably, bottom surface 32*n* of the main waveguide and bottom surfaces 34*n*, 35*n* of detection waveguides 34, 35, respectively, are formed along the same plane (not shown).

Figure 7:
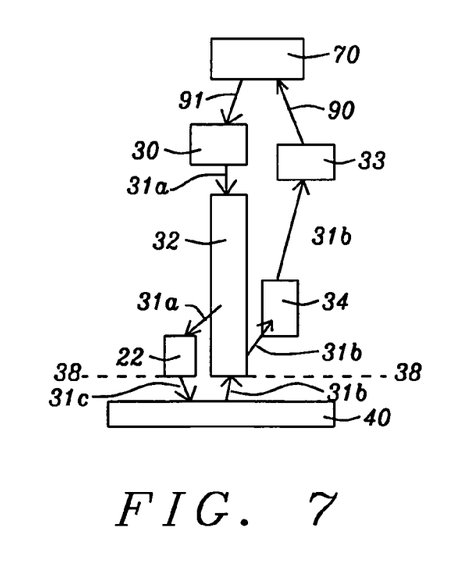
FIG. 7 is a closed loop configuration of an integrated light measurement device that allows the intensity of back reflected light from the ABS and media to be measured and controlled on a real time basis according to an embodiment of the present invention.

Referring to FIG. 7, the present invention is also an integrated light measurement device for detecting the light intensity produced by an EPG at the ABS/media interface in a TAMR head. As explained earlier, it is critical to know the light intensity at the ABS in a TAMR scheme in order to adequately control the thermally assisted write process. In the exemplary embodiment, a single detection waveguide 34 as described earlier is depicted in order to simplify the drawing. However, the present invention also encompasses a dual detection waveguide system (FIG. 5) wherein one of the detection waveguides 34 (or 35) directs back reflected light 31*b* to a photo detector 33*a* (or 33*b*) while the other photo detector is not necessary for light intensity measurements.

The design illustrated in FIG. 7 features a closed loop system whereby light 31*a* from a light source 30 is transmitted through a waveguide 32 and is converted to plasmon waves 31*c* in EPG 22. A portion of the light 31*c* impinging on the medium 40 and ABS 38-38 is reflected and captured by waveguide 32 and this back reflected light 31*b* travels towards the light source. A small fraction of light 31*b* is diverted into detection waveguide 34 and is thereby directed to photo detector 33 where a light intensity reading is performed and output data 90 is sent to a controller 70. Controller 70 is preprogrammed to correlate light intensity data 90 to the intensity of light 31*c* at the ABS/media interface and may send a signal 91 to the light source 30 to either increase or decrease LD power (and output light intensity 31*a*), if necessary, in order to maintain an essentially constant intensity of light 31*c* at the ABS and medium 40. For example, the controller 70 may be preprogrammed using data obtained by a generating a series of known output light intensities 31*a*1, 31*a*2, etc. at a fixed LD power and with a known spacing between ABS and media, and then measuring the corresponding back reflected light intensities 31*b*1, 31*b*2, etc. at photo detector 33. Thus, a back reflected light intensity 31*bi* can be determined for each output light intensity 31*ai* at a fixed LD power and ABS/media spacing in a set up phase.

In another aspect, the ABS/media spacing may be changed a number of times and the aforementioned series of measurements involving different output light intensities is repeated at a fixed LD power. It should be understood that the intensity of plasmon waves 31*c* at the ABS is essentially a fixed percentage of the intensity of output light 31*a* and this relationship enables a strong correlation of the intensity of plasmon waves 31*c* to the intensity of back reflected light captured by photo detector 33. An additional benefit of the integrated light measurement system described herein is that the ABS/media spacing can be determined at a fixed LD power and in the absence of a magnetic field so that one can easily detect if a slider is in a loaded or unloaded position. For example, as the ABS/media spacing increases, the intensity of back reflected light 31*b* decreases. Furthermore, the light intensity measurements according to the present invention may be performed over written data tracks since no magnetic field is required for the integrated light measurement device to function. Accordingly, a lower intensity of light 31*a* may be used for light intensity measurements in a non-recording condition than during an actual TAMR write process.

As mentioned previously with regard to the single detection waveguide configuration in the first embodiment, a small percentage of the output light 31*a* may be diverted (coupled out) to waveguide 34. Similarly, less than about 10% of back reflected light 31*b* is preferably diverted to detection waveguide 34. The so-called coupling efficiency of diverting light 31*a* from waveguide 32 into waveguide 34 is not necessarily the same as the coupling efficiency of light 31*b* in the return direction because there is an asymmetry of the detection waveguide with respect to propagation direction. In other words, light transmitted within a detection waveguide toward end 34*e* (FIG. 4*a*) and the ABS does not necessarily follow the same path as light reflected from end 34*e* toward a photodetector 33.

The measurement technique as described herein actually relies on the difference between two measurements wherein any one measurement may be represented by $I_B$=f(ABS-media spacing)+f($I_A$)+f($CE_A$)+f($CE_B$) where $I_B$ is the intensity of back reflected light 31*b* at photo detector 33 and this value is a function of the ABS-media spacing, the intensity of light 31*a* ($I_A$), and the coupling efficiencies of light 31*a* into waveguide 34 ($CE_A$) and of back reflected light 31*b* into waveguide 34 ($CE_B$). Since ($CE_A$) and ($CE_B$) are essentially constant and $I_A$ may be held constant at a fixed LD power, the difference between any two measurements of light intensities 31*b*1 and 31*b*2 at a fixed LD power is mainly dependent on the change in ABS-media spacing. Note that the constant values in the equation above will cancel each other in an $I_{B2}$-$I_{B1}$ calculation where $I_{B1}$ represents the intensity of light 31*b*1 from a first measurement and $I_{B2}$ represents intensity of light 31*b*2 from a second measurement. Therefore, for a fixed LD power and constant $I_A$, the calculation for $I_{B2}$-$I_{B1}$ may be simplified to be a function of the difference [(ABS-medium spacing)$_2$–(ABS-medium spacing)$_1$] abbreviated as (AMS$_2$-AMS$_1$). In one embodiment, the light intensities 31b1 and 31b2 are measured for a first medium and a second medium having an AMS$_C$ and AMS$_2$, respectively.

It follows that the controller 70 may adjust the LD power from light source 30 during a subsequent TAMR write process to maintain a constant $I_B$ and therefore a constant intensity of light 31c at the medium 40 if there is a change in ABS-medium spacing (AMS$_2$-AMS$_1$>0 condition) from one medium to the next that is detected from light intensity measurements during non-write intervals of time. For example, if a light intensity $I_{A1}$ produced by a LD power P1 is used during a set up phase involving a first medium to generate a light intensity $I_{B1}$ at the photo detector 33, and a subsequent measurement involving a light intensity $I_{A1}$ and a second medium generates a response where (AMS$_2$-AMS$_1$)>0, then the LD power may be adjusted during the write process of the second medium such that the light intensity measured at the photo detector 33 remains the same as detected during the write process of the first medium. Since light intensity $I_B$ strongly correlates to the intensity of light 31c at the ABS and media, the result will be an essentially constant intensity of plasmon waves at the ABS/media interface during a series of TAMR write processes on a plurality of magnetic media.

Figure 8:
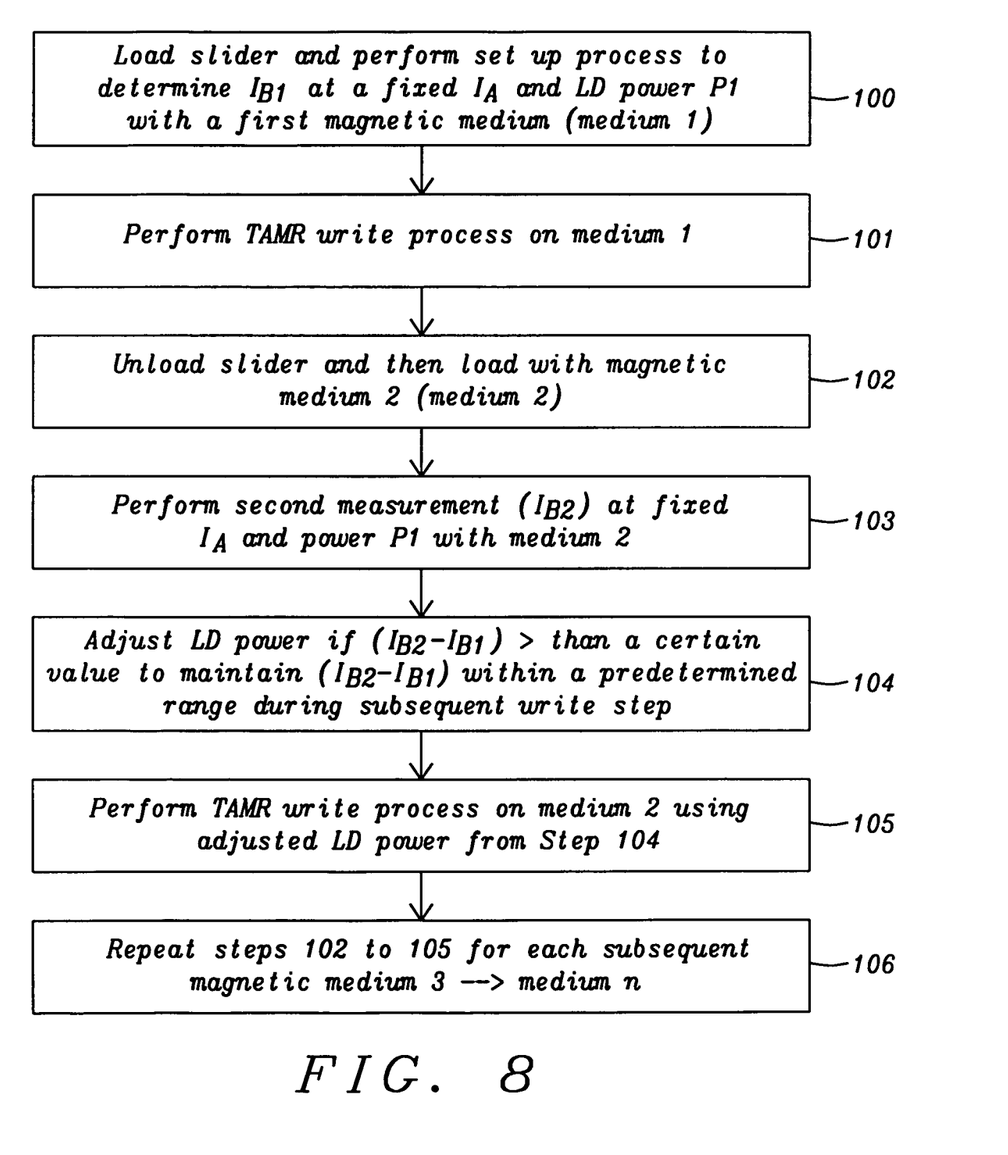
FIG. 8 is a flow diagram showing how light intensity measurements may be used to control the light intensity at the ABS/media interface during a TAMR write process according to a method of the present invention.

Referring to FIG. 8, a flow diagram depicts the following sequence of steps that may be followed to maintain a constant intensity of light 31c at the magnetic media 40 during a series of write processes. A controlled intensity of light 31c during a series of TAMR write processes is advantageous in providing a higher quality of written data than when the intensity of plasmon waves cannot be monitored or maintained within a certain intensity range as in the prior art. In step 100, the slider (not shown) is loaded and a set up process as described previously is performed with a constant LD power P1 in the absence of a magnetic field. A first measurement of light intensity $I_{B1}$ of back reflected light 31b1 is taken by photo detector 33 and the data sent to controller 70. This measurement may be repeated a plurality of times to establish a mean value for the correlation between intensity $I_A$ of light 31a and $I_{B1}$. Moreover, the set up process may involve different ABS-medium spacings to establish a correlation between $I_A$ and $I_B$ in the equation $I_B$=f(ABS-media spacing). A first light intensity value $I_{A1}$ is determined that will deliver a certain $I_{B1}$ intensity with the first magnetic medium (medium 1) during a non-write process. Then in step 101, a write process is performed by increasing the LD power such that $I_{W1}$=$I_{A1}$+$I_F$ where $I_{w1}$ is the write power for medium 1 and $I_F$ is a fixed value required to provide the extra amount of energy intensity at the magnetic media during a TAMR write process. Step 102 comprises unloading the slider and loading with a second magnetic medium.

During step 103, a light intensity measurement $I_{B2}$ is taken with an LD power P1 and intensity $I_A$ for light 31a during a non-write condition. If $I_{B2}$=$I_{B1}$, then no power adjustment (step 104) is necessary for a subsequent write process involving medium 2 and the write process (step 105) is performed with the same power $I_{W2}$=$I_{W1}$=$I_{A1}$+$I_F$ as employed in step 102. However, if $I_{B2}$>$I_{B1}$ or $I_{B2}$<$I_{B1}$, then an adjustment in LD power is calculated by controller 70 to generate a new intensity $I_{A2}$ that would give a light intensity measurement $I_{B2}$=$I_{B1}$. In that case, the write process (step 105) for medium 2 is performed with a power $I_{W2}$=$I_{A2}$+$I_F$ in order to produce the same energy intensity at medium 2 as during the write process of media 1. In step 106, the slider is unloaded and then loaded with a third medium if so desired. Steps 102-105 may be repeated a plurality of times until all of the magnetic media are written to. Therefore, the energy delivered to each medium during a thermally assisted write process should be essentially constant even though the ABS-medium spacing may vary from one write process to the next.

Referring to FIG. 9, a plot illustrates how coupling efficiency is related to the coupling length d of the detection waveguide for different gap distances a between the main waveguide and the detection waveguides when diverting back reflected light from the former into the latter as depicted in the embodiment represented in FIG. 5 for a symmetrical waveguide configuration. In general, coupling efficiency decreases as gap distance a increases from 0.1 to 0.5 microns except for longer coupling lengths of 7 to 8 microns where a gap distance of 0.2 microns provides higher coupling efficiency than a small gap distance of 0.1 microns.

Referring to FIG. 10, a plot illustrates how transmitted light is affected by the coupling length d of the detection waveguide for different gap distances a between the main waveguide and detection waveguide when no reflection occurs at the end of the main waveguide for the embodiment having a symmetric configuration as depicted in FIG. 5. Although transmission efficiency for the main waveguide is essentially the same for gap distances of 0.1 and 0.2 microns, there is a significant decrease in transmission efficiency at gap distances of 0.3 to 0.5 microns.

The present invention has an advantage over the prior art in that it includes a unique waveguide structure that enables the delivery of a more constant plasmon wave energy at the ABS/media interface when writing a series of magnetic media in a manufacturing operation. The integrated light intensity measurement device may be used to determine ABS-media spacing more accurately than previous methods by monitoring the back reflected light intensity with a fixed LD power to the light source. The measurement method is highly flexible since back reflected light intensity may be monitored during either non-write conditions or in a write process. A set up process may be used to make calculations with different light intensities and different ABS/media spacings that allow the controller to be programmed to make real time adjustments during a series of TAMR write processes. Fabrication of the new waveguide structure should not have a significant impact on cost since the detection waveguides can be formed during the same process steps used to produce the main waveguide.

While this invention has been particularly shown and described with reference to, the preferred embodiment thereof, it will be understood by those skilled in the art that various changes in form and details may be made without departing from the spirit and scope of this invention.

We claim:

1. A thermally assisted magnetic recording (TAMR) head comprising:
   (a) a light source that employs a power to generate light and transmit into a main waveguide and towards an air bearing surface (ABS) that is proximate to a magnetic medium thereby forming an ABS/media interface;
   (b) the main waveguide for transmitting light to a nearfield device, said main waveguide has a lengthwise dimension in a direction perpendicular to the ABS with one end at the ABS and a second end proximate to said light source;
   (c) the nearfield device that converts light from the waveguide into plasmon waves and delivers energy from the plasmon waves onto a localized region of said magnetic medium thereby heating said localized region and reducing its magnetic coercivity and anisotropy, said energy produces back reflected light as a result of an impedance change at the ABS/media interface, the back reflected light is captured by an end of the main waveguide at the ABS;

(d) a first detection waveguide that captures a portion of back reflected light in the main waveguide, said first detection waveguide has an end facing away from the ABS and that is proximate to a photo detector and comprises:
- (1) a first section formed substantially parallel to the main waveguide and located a gap distance therefrom, said first section is recessed a certain distance from the ABS and has a first end facing the ABS, and a second end connected to a second section of the first detection waveguide; and
- (2) the second section that has a first end adjoining the second end of the first section and a second end that is formed a greater (separation) distance from the main waveguide than said gap distance;

(e) the photo detector that receives back reflected light from the detection waveguide and performs a light intensity measurement to generate light intensity data; and (f) a controller that receives light intensity data from the photo detector, calculates a power adjustment, and sends a command regarding power adjustment to the light source to maintain a constant energy at the ABS/media interface during a TAMR write process.

2. The TAMR head of claim 1 wherein the second end of the second section of the first detection waveguide is adjoined to the photo detector or is separated therefrom by a gap distance up to about 3 microns that is filled with one or more of an air space, anti-reflective coating (ARC), or a dielectric material.

3. The TAMR head of claim 1 wherein the first detection waveguide is further comprised of a third section that is formed substantially parallel to the main waveguide and has a first end adjoining the second end of the second section, and a second end adjoined to the photo detector or separated therefrom by a gap distance of up to about 3 microns that is filled with one or more of an air space, anti-reflective coating (ARC), or a dielectric material.

4. The TAMR head of claim 1 wherein the gap distance between the main waveguide and first section of first detection waveguide is from about 100 to 400 nm.

5. The TAMR head of claim 1 wherein a distance between the first end and second end of the first section of first detection waveguide is called the coupling length and is between about 2 and 10 microns.

6. The TAMR head of claim 1 further comprised of a second detection waveguide including a first section and second section each with first and second ends that is formed on an opposite side of the main waveguide with respect to the first detection waveguide, said first and second detection waveguides are symmetrically aligned with respect to the main waveguide such that the first section of each detection waveguide is formed the same gap distance from the main waveguide, a first end of each first section is recessed the same distance from the ABS, and the second end of each second section is formed essentially the same separation distance from the main waveguide wherein the separation distance is greater than said gap distance.

7. The TAMR head of claim 6 wherein each of the first and second detection waveguides is further comprised of a third section that is formed substantially parallel to the main waveguide and each third section has a first end adjoining the second end of a second section, and a second end adjoined to a photo detector or separated therefrom by a gap distance of up to about 3 microns that is filled with one or more of an air space, anti-reflective coating (ARC), or a dielectric material.

8. The TAMR head of claim 1 wherein nearfield device is an edge plasmon generator (EPG) having a first end at the ABS and extending in a lengthwise dimension perpendicular to the ABS such that a second end facing away from the ABS is a distance of about 1 to 1.5 microns from the ABS.

9. The TAMR head of claim 8 wherein the certain distance that the first end of the first section of first detection waveguide is recessed from the ABS is between about 3 and 10 microns to provide a distance of at least 1 micron between said second end of the EPG and said first end of the first section of first detection waveguide.

10. The TAMR head of claim 1 wherein the portion of back reflected light captured by the first detection waveguide is less than about 10% of the back reflected light captured by the main waveguide at the ABS/media interface.

11. The TAMR head of claim 7 wherein the second end of the third section in each of the first detection waveguide and second detection waveguide is formed the same distance or a lesser distance from the ABS as the second end of the main waveguide.

12. An integrated light intensity measurement device for monitoring and controlling the intensity of incident plasmon wave energy at the ABS during a thermally assisted magnetic recording (TAMR) write process, comprising:

(a) a light source that employs a power to generate light having an intensity $I_A$ into a main waveguide and towards an air bearing surface (ABS) that is proximate to a magnetic medium thereby forming an ABS/media interface;

(b) the main waveguide for transmitting light to a nearfield device, said main waveguide has a lengthwise dimension in a direction perpendicular to the ABS with one end at the ABS and a second end proximate to said light source;

(c) the nearfield device that converts light from the waveguide into plasmon waves and delivers plasmon wave energy onto a localized region of said magnetic medium, said plasmon wave energy produces back reflected light as a result of an impedance change at the ABS/media interface, a portion of the back reflected light is captured by an end of the main waveguide at the ABS;

(d) a detection waveguide that captures a portion of back reflected light in the main waveguide, said detection waveguide has an end facing away from the ABS and that is proximate to a photo detector and comprises:
- (1) a first section formed substantially parallel to the main waveguide and located a gap distance therefrom, said first section is recessed a certain distance from the ABS and has a first end facing the ABS, and a second end located a coupling length from said first end and connected to a second section of the detection waveguide; and
- (2) the second section that has a first end adjoining the second end of the first section, and a second end that is formed a greater distance from the main waveguide than said gap distance;

(e) the photo detector that receives back reflected light from the detection waveguide, measures an intensity $I_B$ thereof, and generates light intensity data, said photo detector is connected to a controller; and (f) a controller that receives light intensity data from the photo detector and forms a closed loop system with the aforementioned components of the integrated light intensity measurement device, and calculates a power adjustment, that is transmitted to the light source to maintain a constant plasmon wave energy at the ABS/media interface during a series of TAMR write processes involving a plurality of magnetic media.

13. The integrated light intensity measurement device of claim 12 wherein the intensity ($I_B$) of back reflected light delivered by the detection waveguide to the photo detector is less than about 10% of the back reflected light captured by the main waveguide at the ABS/media interface.

14. The integrated light intensity measurement device of claim 12 wherein the intensity $I_A$ is less for a light intensity measurement during a non-write condition than during a TAMR write process.

15. The integrated light intensity measurement device of claim 12 wherein a measurement of the intensity $I_B$ of back reflected light is performed using a magnetic medium with written data tracks and in the absence of an applied magnetic field to determine whether a slider is in a loaded or unloaded condition.

16. The integrated light intensity measurement device of claim 12 wherein the main waveguide and detection waveguide each have bottom surfaces formed on the same plane and each have a thickness in a down track direction that is essentially the same.

17. The integrated light intensity measurement-device of claim 12 wherein a first intensity $I_B$ is taken during a non-write condition with a first magnetic medium, a second intensity $I_B$ is taken during a non-write condition with a second magnetic medium, and the difference between the two $I_B$ intensities is calculated by the controller and used to determine a power for a TAMR write process of the second magnetic medium that will deliver the same intensity of plasmon wave energy produced at the ABS/media interface as during a TAMR write process of the first magnetic medium.

18. The integrated light intensity measurement device of claim 12 further comprised of a second detection waveguide symmetrically aligned on a side of the main waveguide that is opposite said detection waveguide.

19. The integrated light intensity measurement device of claim 18 wherein the main waveguide has a different width in a cross-track direction than the detection waveguide and second detection waveguide.

20. The integrated light intensity measurement device of claim 12 wherein one or both of the gap distance and coupling length may be modified to adjust the intensity of back reflected light captured by the detection waveguide.

21. A method of monitoring and controlling a plasmon wave energy intensity delivered at an ABS/medium interface in a TAMR head, comprising:

(a) providing an integrated light intensity measurement system, comprising:
  (1) a light source that directs light into a main waveguide and towards an ABS that is proximate to a magnetic medium thereby forming an ABS/medium interface;
  (2) the main waveguide for transmitting light to a nearfield device, said main waveguide has a lengthwise dimension in a direction perpendicular to the ABS with one end at the ABS and a second end proximate to said light source;
  (3) the nearfield device that converts light from the waveguide into plasmon waves and delivers plasmon wave energy to said magnetic medium, said plasmon wave energy produces back reflected light as a result of an impedance change at the ABS/media interface, a portion of the back reflected light is captured by an end of the main waveguide at the ABS;
  (4) a detection waveguide that captures a portion of back reflected light in the main waveguide, said detection waveguide has an end facing away from the ABS and that is proximate to a photo detector;
  (5) the photo detector that receives back reflected light from the detection waveguide, measures an intensity $I_B$ thereof, and generates light intensity data, said photo detector is connected to a controller; and
  (6) a controller that receives light intensity data from the photo detector and forms a closed loop system with the aforementioned components of the integrated light intensity measurement device;
(b) producing a light intensity $I_{A1}$ in the main waveguide that generates a back reflected light intensity with a first magnetic medium in a non-write state that is measured as an intensity $I_{B1}$ in said photo detector;
(c) performing a TAMR write process with said first magnetic medium wherein a first plasmon wave intensity is produced at an ABS/medium 1 interface;
(d) producing a light intensity $I_{A2}$ in the main waveguide that generates a back reflected light intensity with a second magnetic medium in a non-write state that is measured as an intensity $I_{B2}$ in said photo detector;
(e) calculating a difference ($I_{B2}$-$I_{B1}$) in said controller that is used to determine a light intensity required during a write process with the second magnetic medium to produce the first plasmon wave intensity at an ABS/medium 2 interface; and
(f) performing a TAMR write process with the second magnetic medium wherein a first plasmon wave intensity is produced at an ABS/medium 2 interface.

* * * * *